United States Patent
Li et al.

(10) Patent No.: US 11,035,884 B2
(45) Date of Patent: Jun. 15, 2021

(54) MULTIPLE NETWORK PROBING

(71) Applicant: Apple Inc., Cupertino, CA (US)

(72) Inventors: Guoqing Li, Campbell, CA (US); Jarkko L. Kneckt, Los Gatos, CA (US); Yong Liu, Campbell, CA (US); Christiaan A. Hartman, Mountain View, CA (US); Welly Kasten, San Jose, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 16/723,226

(22) Filed: Dec. 20, 2019

(65) Prior Publication Data

US 2020/0217875 A1 Jul. 9, 2020

Related U.S. Application Data

(60) Provisional application No. 62/788,053, filed on Jan. 3, 2019.

(51) Int. Cl.
*G01R 1/067* (2006.01)
*H04L 29/06* (2006.01)
*H04W 88/08* (2009.01)

(52) U.S. Cl.
CPC .......... *G01R 1/06788* (2013.01); *H04L 63/10* (2013.01); *H04W 88/08* (2013.01)

(58) Field of Classification Search
CPC .... G01R 1/06788; H04L 63/10; H04W 88/08; H04W 12/50; H04W 84/12; H04W 48/12; H04W 12/08; H04W 12/10; H04W 48/16; H04W 76/11; H04W 88/10

See application file for complete search history.

(56) References Cited

U.S. PATENT DOCUMENTS

| | | |
|---|---|---|
| 8,565,165 B2 | 10/2013 | Ise et al. |
| 9,258,767 B2 | 2/2016 | Park |
| 9,642,171 B2 | 5/2017 | Abraham et al. |
| 2014/0337633 A1 | 11/2014 | Yang et al. |
| 2014/0337950 A1 | 11/2014 | Yang et al. |
| 2015/0319599 A1* | 11/2015 | Seok ............... H04W 8/005 370/338 |
| 2020/0217875 A1 | 7/2020 | Li et al. |

* cited by examiner

*Primary Examiner* — Joseph E Dean, Jr.
(74) *Attorney, Agent, or Firm* — Kowert, Hood, Munyon, Rankin & Goetzel P.C.

(57) ABSTRACT

Methods, systems, and apparatus are presented for performing network probing. A user equipment device (UE) may store a record associating traditional service set identifiers (SSIDs) with corresponding Short SSIDs. According to some embodiments, the UE may receive a message including a Short SSID, and determine whether a corresponding full SSID is known to the UE. Based on the determination, a probe request may be generated, addressed to either the Short SSID or the full SSID. After transmitting the probe request, the UE may receive a probe response, which may include a full SSID corresponding to the Short SSID. The UE may store a record associating the full SSID with the Short SSID, if applicable. According to some embodiments, a UE may receive a plurality of messages including respective SSIDs, and may generate a single probe request addressed to the SSIDs. The UE may receive a plurality of probe responses.

20 Claims, 7 Drawing Sheets

MULTIPLE NETWORK PROBING

PRIORITY CLAIM

This application claims benefit of priority of U.S. provisional application Ser. No. 62/788,053, titled "Multiple Network Probing", filed Jan. 3, 2019, whose inventors are Guoqing Li et al., which is hereby incorporated by reference in its entirety as though fully and completely set forth herein.

TECHNICAL FIELD

The present application relates to wireless communication, including to techniques for performing network probing.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that access wireless local area networks (WLANs). In many environments, a large number of WLAN access points may be available, and it may be a time and energy intensive process for a UE to determine the most desirable wireless access point upon which to connect. Therefore, improvements in the field are desired.

SUMMARY

Embodiments are presented herein of, inter alia, systems, apparatuses, and methods for performing network probing.

A method is presented in which a user equipment device (UE) may receive, from an access point (AP), a first message including a Short service set identifier (SSID), the Short SSID including a compressed version of a full SSID of a service set supported by the AP. The UE may determine whether the UE has a record associating a full SSID with the Short SSID. The UE may transmit a probe request, wherein, in response to determining that the UE has no record associating the full SSID with the Short SSID, the probe request is addressed to the Short SSID.

In some scenarios, in response to determining that the UE has a record associating the full SSID with the Short SSID, the probe request is addressed to the full SSID.

In some scenarios, the probe request may include a field indicating whether the probe request is addressed to the Short SSID or the full SSID. In some such scenarios, the field indicating whether the probe request is addressed to the Short SSID or the full SSID may include a Length field. A value of 0 in the Length field may indicate that the probe request is addressed to the Short SSID, and a value other than 0 in the Length field may indicate that the probe request is addressed to the full SSID, the full SSID having a length specified by the value of the Length field.

In some scenarios, in response to determining that the UE has no record associating the full SSID with the Short SSID, the UE may include in the probe request an instruction for the AP to transmit a probe response comprising the full SSID.

In some scenarios, in response to determining that the UE has a record associating the full SSID with the Short SSID, the UE may include in the probe request an instruction for the AP to use the Short SSID to identify the service set in the probe response.

In some scenarios, the probe request may include a field indicating whether a probe response that is responsive to the probe request is to include the Short SSID or the full SSID to identify the service set.

In some scenarios, the UE may receive, from the AP, a probe response comprising the full SSID. The UE may store a record associating the full SSID with the Short SSID.

In some scenarios, the probe request may be addressed to a plurality of SSIDs of a plurality of service sets, the plurality of SSIDs including the received Short SSID. In some such scenarios, the plurality of SSIDs may include at least one full SSID of a service set other than the service set associated with the received Short SSID. In some scenarios, the probe request further may further include a field indicating a count of the SSIDs to which the probe request is addressed.

In some scenarios, the probe request may be further addressed to a plurality of basic service set identifiers (BSSIDs), wherein the probe request may include a field indicating a count of the BSSIDs to which the probe request is addressed.

In some scenarios, first message may be received in a first frequency band and may include a report that the AP supports communications on a second frequency band.

Apparatuses are disclosed for performing any of the above methods.

Also disclosed are non-transitory computer-readable media storing software instructions configured to, when executed by a processor of a UE, cause the UE to perform any of the above methods.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in this disclosure.

AP: Access Point
BSS: Basic Service Set
BSSID: Basic Service Set Identifier (as used herein, BSSID is distinct from SSID)
GSM: Global System for Mobile Communications
LTE: Long Term Evolution
MAC: Medium Access Control
SSID: Service Set Identifier (e.g., may include a Short SSID or a full SSID; distinct from, and exclusive of, BSSID, as used herein)
STA: Station (e.g., a wireless communication station)
UE: User Equipment
UMTS: Universal Mobile Telecommunications System
WLAN: Wireless Local Area Network Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
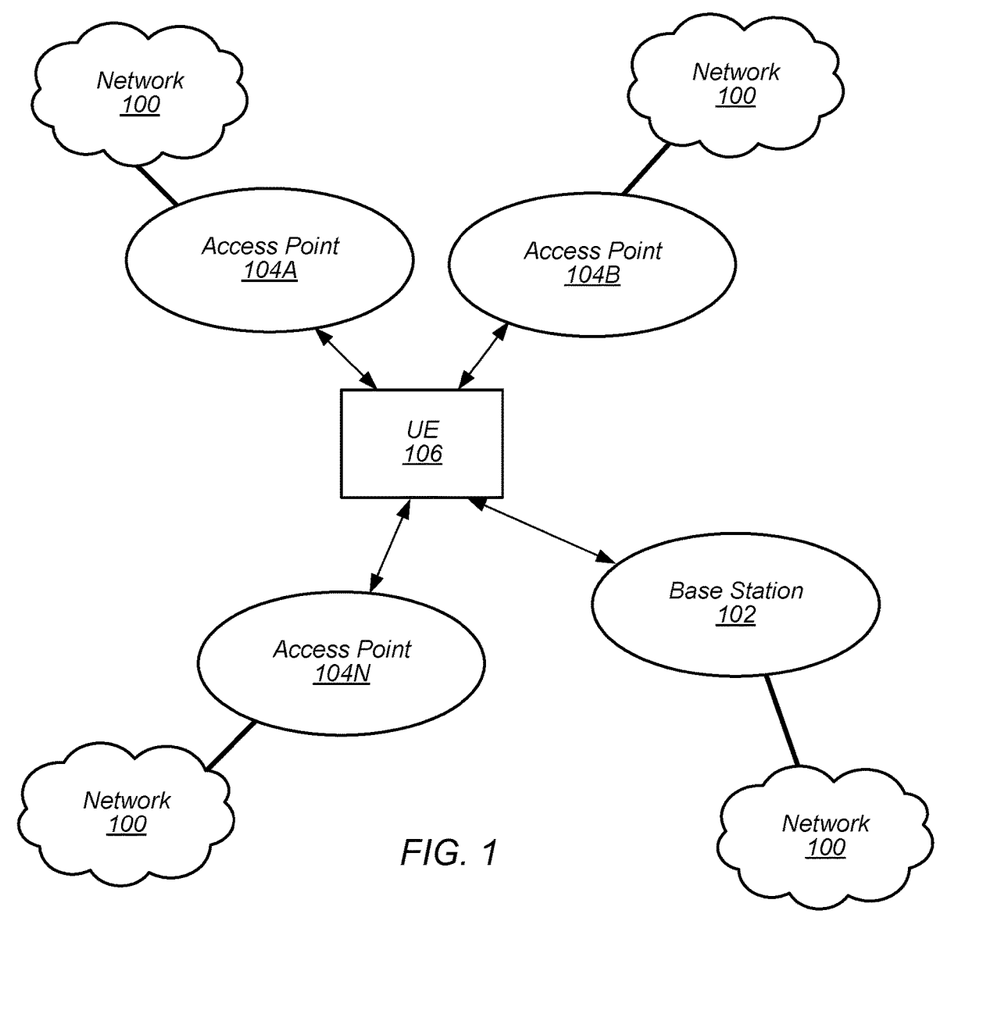
FIG. 1 illustrates an example wireless communication system including a user equipment device (UE), according to some embodiments.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a plurality of wireless access points (APs) 104A-104N, which communicate over a wireless local area network (WLAN) with a wireless device 106. The wireless device 106 may be a user device, which may be referred to herein as "user equipment" (UE), or a UE device.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN (including Wi-Fi or IEEE 802.11-compliant protocols), Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a plurality of WLAN APs 104A-N, which communicate over a transmission medium with the wireless device 106. The WLAN AP, which may be a Wi-Fi AP, also provides communicative connectivity to the network 100. Each of the WLAN APs (which may be more concisely referred to herein as "APs") may communicate within one or more different WLAN frequency bands, such as 2.4 GHz, 5 GHz, and/or 6 GHz, among other possibilities. Thus, according to some embodiments, wireless devices may be able to connect to one or more of the access points 104A-N and/or the base station 102 (or another cellular base station) to access the network 100 at a given time.

The UE 106 may include a handheld device such as a smart phone or tablet, and/or may include any of various types of device with cellular communications capability. For example, the UE 106 may be a wireless device intended for stationary or nomadic deployment such as an appliance, measurement device, control device, etc.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors.

Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. Other configurations are also possible.

The UE 106 may be further configured to wirelessly communicate with a cellular base station 102, which may also be equipped to communicate with the network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to the UE device 106 and similar devices over a geographic area via one or more cellular communication technologies.

The UE 106 and/or one or more of the APs 104 may be configured to perform any of the methods disclosed herein, e.g., to perform network probing.

Figure 2:
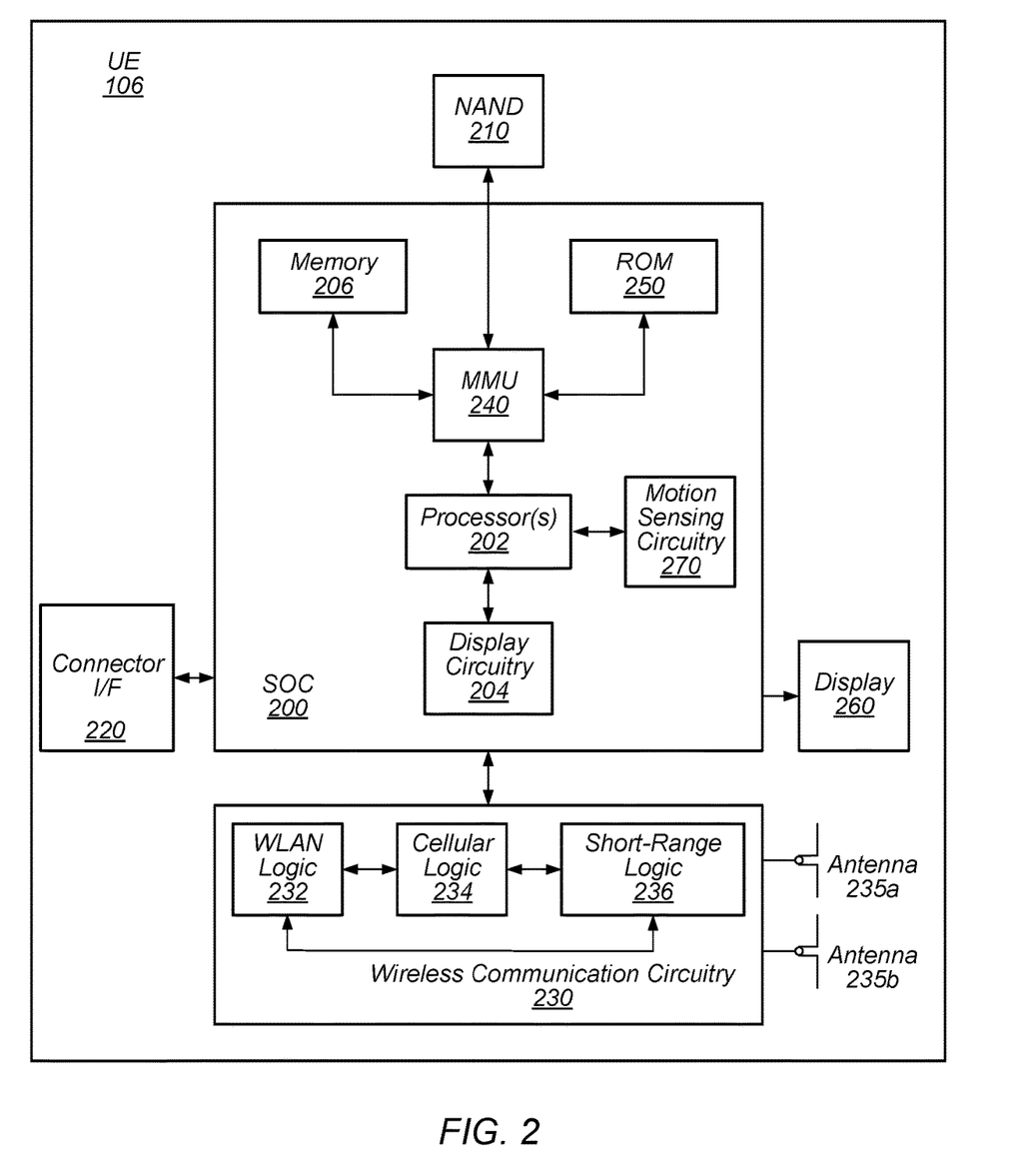
FIG. 2 is a block diagram illustrating an example UE, according to some embodiments.

FIG. 2—Example Block Diagram of a UE Device

FIG. 2 illustrates one possible block diagram of a UE device, such as UE device 106. As shown, the UE device 106 may include a system on chip (SOC) 200, which may include portions for various purposes. For example, as shown, the SOC 200 may include processor(s) 202 which may execute program instructions for the UE device 106, and display circuitry 204 which may perform graphics processing and provide display signals to the display 260. The SOC 200 may also include motion sensing circuitry 270 which may detect motion of the UE 106, for example using a gyroscope, accelerometer, and/or any of various other motion sensing components. The processor(s) 202 may also be coupled to memory management unit (MMU) 240, which may be configured to receive addresses from the processor(s) 202 and translate those addresses to locations in memory (e.g., memory 206, read only memory (ROM) 250, flash memory 210). The MMU 240 may be configured to perform memory protection and page table translation or set up. In some embodiments, the MMU 240 may be included as a portion of the processor(s) 202.

As shown, the SOC 200 may be coupled to various other circuits of the UE 106. For example, the UE 106 may include various types of memory (e.g., including NAND flash 210), a connector interface (I/F) 220 (e.g., for coupling to a computer system, dock, charging station, etc.), the display 260, and wireless communication circuitry 230 (e.g., for LTE, LTE-A, NR, CDMA2000, Bluetooth, Wi-Fi, NFC, GPS, etc.).

The UE device 106 may include at least one antenna, and in some embodiments, multiple antennas 235a and 235b, for performing wireless communication with base station 102, wireless access points 104, and/or other devices. For example, the UE device 106 may use antennas 235a and 235b to perform the wireless communication. In some implementations, the antenna 235a and/or the antenna 235b may include a plurality of antennas and/or one or more antenna arrays. As noted above, the UE device 106 may in some embodiments be configured to communicate wirelessly using a plurality of wireless communication standards or radio access technologies (RATs). In some scenarios, such as when the UE 106 is communicating or attempting to communicate over a WLAN network, e.g., with a wireless access point 104, the UE 106 may be referred to as a wireless communication station, a wireless station, or "STA".

The wireless communication circuitry 230 may include WLAN Logic 232, Cellular logic 234, and/or Short-range Logic 236. The WLAN Logic 232 is for enabling the UE device 106 to perform Wi-Fi and/or other WLAN communications on a wireless network, such as an 802.11 network. The Short-range Logic 236 is for enabling the UE device 106 to perform wireless communications according to any of various short-range communication protocols, such as Bluetooth (BT), Bluetooth Low-Energy (BLE), near-field communication (NFC), ultra wideband (UWB), etc. The cellular logic 234 may be a cellular modem capable of performing cellular communication according to one or more cellular communication technologies, such as GSM, UMTS, LTE, LTE-A, 5G NR, HSPA, 3GPP2 CDMA2000, etc. In some scenarios, each of the WLAN Logic 232, the Cellular Logic 234, and the Short-range Logic 236, or some portion thereof, may be referred to as a radio. For example, the WLAN Logic 232 may be referred to as, or may include, a WLAN radio, such as a Wi-Fi radio; the Cellular Logic 234 may be referred to as, or may include, a cellular radio; and/or the Short-range Logic 336 may be referred to as, or may include, one or more of a BT radio, a NFC radio, a UWB radio, etc.

As described herein, UE 106 may include hardware and software components for implementing embodiments of this disclosure, e.g., to perform network probing according to any of the methods disclosed herein. For example, one or more components of the wireless communication circuitry 230 (e.g., WLAN Logic 232, cellular logic 234, Short-range Logic 236) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
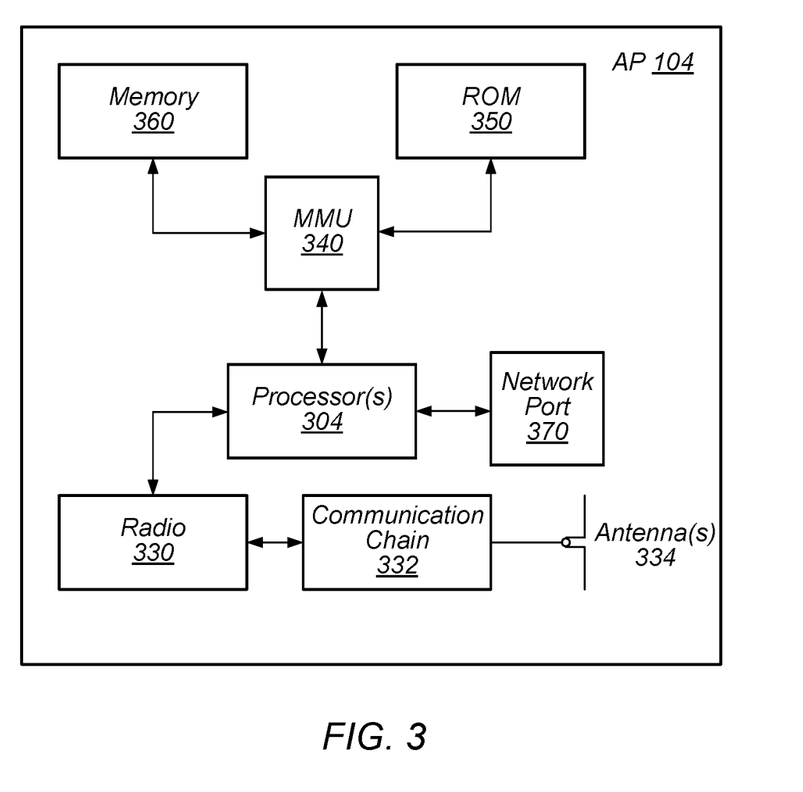
FIG. 3 is a block diagram illustrating an example wireless access point, according to some embodiments.

FIG. 3—Block Diagram of a WLAN Access Point

FIG. 3 illustrates an example block diagram of a WLAN access point (AP) 104, according to some embodiments. It is noted that the AP of FIG. 3 is merely one example of a possible AP. As shown, the AP 104 may include processor(s) 304 which may execute program instructions for the access point 104. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The AP 104 may include at least one network port 370. The network port 370 may be configured to couple to a telephone network and provide a plurality of devices, such as UE devices 106, access to the telephone network as described above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

The AP 104 may include at least one wireless transceiver, which may include one or more radio 330, one or more communication chain 332 and one or more antenna 334. The wireless transceiver and may be further configured to communicate with UE device 106. Communication chain 332 may be a receive chain, a transmit chain, or both, and may include, e.g., physical layer processing circuitry. The radio 330 may be configured to communicate via one or more of various wireless communication standards, including, but not limited to, LTE, LTE-A, NR, GSM, UMTS, CDMA2000, Wi-Fi, etc. Each of the antennas 334 may be configured to operate within a different frequency band, and/or within a separate WLAN network, in some embodiments.

The AP 104 may be configured to communicate wirelessly using multiple wireless communication standards. For example, as one possibility, the AP 104 may include an LTE or 5G NR radio for performing communication according to LTE or 5G NR, as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

In some embodiments the AP 104 may be configured to provide one or more basic service sets (BSSs). For example, the AP 104 may service a single BSS identified by a BSS identifier (BSSID). Alternatively, the AP 104 may comprise a multi-BSS AP that services multiple BSSs on separate channels, each with their own respective BSSID. Each of the BSSs of a multi-BSS AP may operate in a separate channel with a separate system set identifier (SSID).

As described further subsequently herein, the AP 104 may include hardware and software components for implementing or supporting implementation of features described herein, e.g., to support network probing according to any of the methods disclosed herein. The processor(s) 304 of the access point 104 may be configured to implement or support implementation of part or all of the methods described herein, e.g., by executing program instructions stored on a memory medium (e.g., a non-transitory computer-readable memory medium). Alternatively, the processor(s) 304 may be configured as a programmable hardware element, such as an FPGA (Field Programmable Gate Array), or as an ASIC (Application Specific Integrated Circuit), or a combination thereof. Alternatively (or in addition) the processor 304 of the AP 104, in conjunction with one or more of the other components 330, 332, 334, 340, 350, 360, and/or 370, may be configured to implement or support implementation of part or all of the features described herein.

FIGS. 4-7—Probing with an Unknown Short SSID

Due to the large amount of data traffic that is transferred over wireless local area networks (WLANs), next generation WLAN networks are currently in development under the IEEE 802.11ax Standard (hereinafter "11ax") that will utilize the 6 GHz band for increased throughput potential. Due to the wide bandwidth on the 6 GHz band (>1 GHz), discovering APs operating on the 6 GHz band may, relative to other bands (e.g., 2.4 GHz and/or 5 GHz), take a very long time. To address this issue, a Reduced Neighbor Report (RNR) element may be transmitted on the 2.4 GHz band and/or the 5 GHz band to advertise any/all APs operating on the 6 GHz band. The RNR may be carried in any of a Beacon frame, a FILS Discovery frame, or a probe response frame on 2.4/5 GHz. The RNR may carry one or more of the following types of information:

1. Neighbor AP Band/Channel
2. Neighbor AP target beacon transmission time (TBTT)
3. Short service set identifier (Short SSID) (this may be optionally present)
4. Basic service set identifier (BSSID) (this may be optionally present)

The Short SSID may be a compressed version of the full SSID (e.g., the traditional SSID or network name). For example, a specific CRC function may be applied to the full SSID to obtain the Short SSID. A full SSID may have a length of, e.g., up to 32 bytes. After compression, the Short SSID may have a length of, e.g., 4 bytes, thus significantly reducing the amount of data used to identify the service set. In other implementations, the Short SSID may have other lengths, such as 1-5 bytes, 5-10 bytes, etc. However, in at least some instances, the compression process may result in information loss, such that recovering the full SSID may not be possible based on the Short SSID.

For that reason, a STA, such as the UE 106, may store a list of known and/or preferred networks, with the list including both the full SSID and the Short SSID. For example, in some scenarios, the STA may apply the applicable cyclic redundancy code (CRC) function to a known full SSID (e.g., stored on the list of known/preferred networks), and may store the resulting Short SSID on the list.

Figure 4:
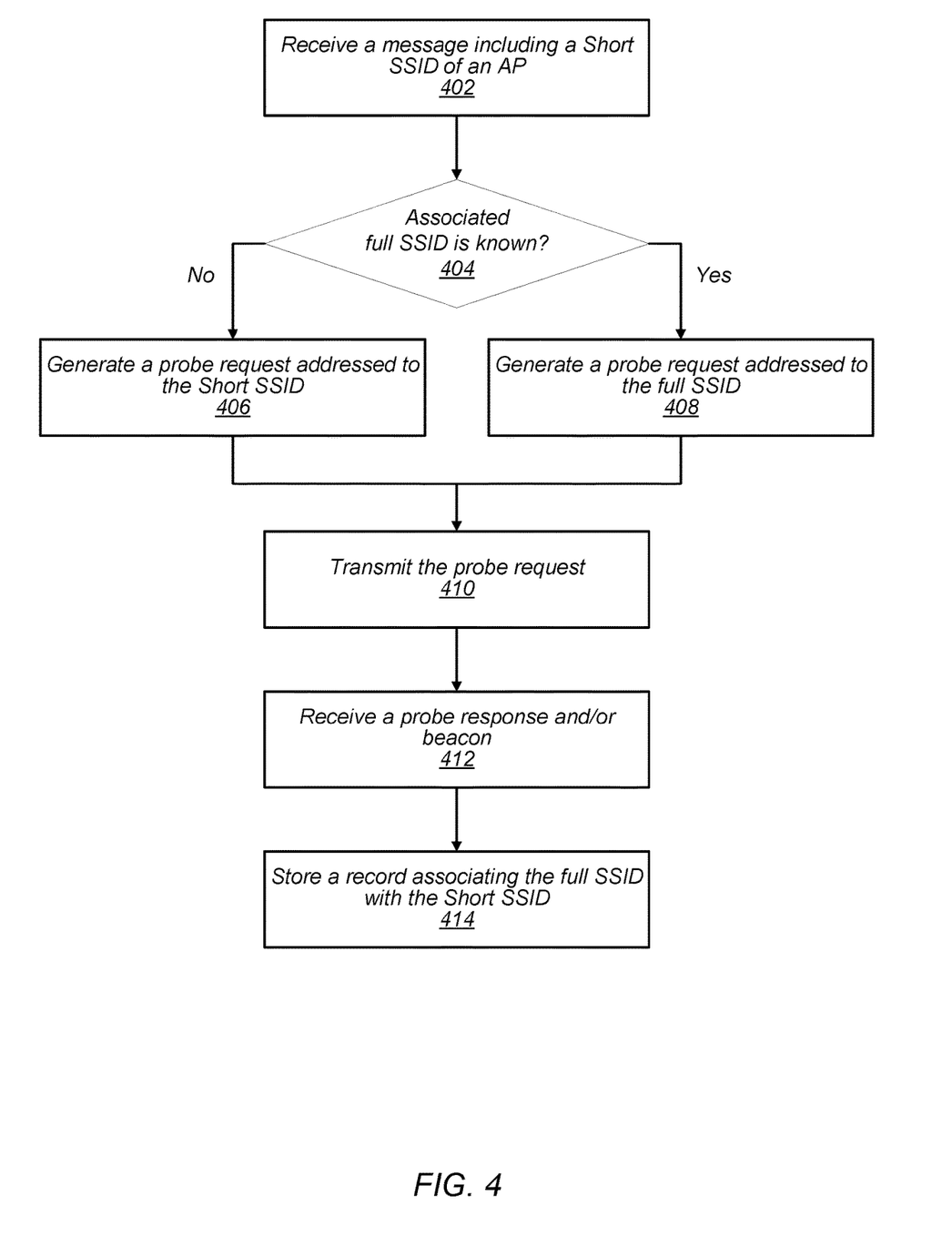
FIG. 4 is a flow chart illustrating an exemplary method for performing network probing in a scenario that may include an unknown Short SSID, according to some embodiments.

However, in some scenarios, the STA may receive from an AP a beacon or other message identifying a new service set that is not stored on the list (or does not match an identifier stored in the list). In such scenarios, the STA may send a probe request to the AP, requesting additional information regarding the service set, e.g., to determine whether the STA is capable of joining the service set. However, if the beacon or other message identifies the new service set only by the Short SSID (e.g., if the message does not include the corresponding full SSID), then the STA may be unable to identify the service set by its full SSID in the probe request. FIG. 4 illustrates such a scenario.

FIG. 4 is a flow chart illustrating an exemplary method for performing network probing in a scenario that may include an unknown Short SSID, according to some embodiments. In various embodiments, the method illustrated in FIG. 4 may be performed by a STA, such as the UE 106; or by one or more components thereof, such as the wireless communication circuitry 230 or the WLAN Logic 232. In various embodiments, some of the elements of the methods shown may be performed concurrently, in a different order than shown, may be substituted for by other method elements, or may be omitted. Additional method elements may also be performed as desired. As shown, the method may operate as follows.

At 402, the STA may receive a first message including a Short SSID of a service set supported by the transmitting device. Specifically, the first message may identify the service set by the Short SSID, and may not include the full SSID of the service set. The first message may be received from an AP or other STA. In some scenarios, the first message may also include a BSSID of the AP. In some scenarios, the first message may include an RNR. The first message may include, or be included in, a beacon frame or a probe response frame.

In some scenarios, the first message may be received in a first frequency band, such as the 2.4 GHz or the 5 GHz band (or a combination thereof), and may include a report or other indication that the service set supports communications on a second frequency band, such as the 6 GHz band. For example, the first message may, in some scenarios, indicate that substantive payload communications are supported by the service set only in the second frequency band, while only limited communications, such as beacon or probe messages, are supported by the service set in the first frequency band. In other scenarios, the first message may indicate that the service set supports communications (e.g., full communications) in the first frequency band.

At 404, the STA may determine whether a full SSID associated with the Short SSID received in the message is known to the STA. For example, the STA may determine whether the STA has a record, e.g., stored in a memory of the STA, such as in a preferred network list, associating a full SSID with the Short SSID; or the STA may determine in any other manner whether the Short SSID corresponds to a known full SSID.

The STA may generate and transmit a probe request to the AP, e.g., responsive to an outcome of this determination. Further, the contents of the probe request may vary based on the results of the determination at 404. For example, the body of the probe request may include an SSID field (or an SSID List field or similar field), such that any AP receiving the probe request should (e.g., is invited or instructed to) or can reply with a probe response if the AP supports the service set identified by an SSID included in the SSID field. In some implementations, the contents of the SSID field may vary based on the determination at 404. In some scenarios, the probe request may be configured to be broadcast to multiple APs, e.g., any/all APs within communication range. For example, a destination address field of the probe request, e.g., in the MAC header, may be set to a "broadcast" value, as opposed to a BSSID or other address of a specific AP. However, the probe request may be considered to be "addressed to" any SSID included in the SSID field (or similar field) in the body of the probe request, e.g., because the probe request may be formatted (or configured, arranged, etc.) to allow an AP to determine whether the probe request was intended for the AP, e.g., based on the contents of that field.

In response to determining at 404 that a full SSID associated with the Short SSID is not known to the STA (e.g., if the STA has no record associating a full SSID with the Short SSID), then the STA may, at 406, generate the probe request addressed to the Short SSID. For example, the SSID field (or similar field) in the body of probe request may include the Short SSID. The probe request generated at 406 does not include the full SSID, e.g., because the full SSID is unknown to the STA.

Alternatively, or additionally, the STA may, at 406, generate the probe request addressed to a BSSID of the AP. For example, the body of the probe request, or a header of the probe request (such as the MAC header), may include a BSSID field (or a BSSID List field or similar field), such that any AP receiving the probe request should reply with a probe response if the AP is associated with (e.g., identified by) a BSSID included in the BSSID field. In some scenarios, the BSSID field may be included in a destination address field of the probe request, such as in the MAC header. In such scenarios, the probe request may be addressed only to the BSSID(s) included in the destination address field (e.g., the BSSID field). In other scenarios, the BSSID field may be included in the body of the probe request, such that the probe request may be addressed to any BSSID(s) included in the BSSID field, as well as to any SSID(s) in the SSID field.

If the STA generates the probe request at 406 addressed to the BSSID of the AP, the probe request may also include the Short SSID, or may omit the Short SSID, e.g., by setting the SSID field to a wildcard value or by omitting the SSID field. As one example, the STA may, in some scenarios, determine whether the AP is capable of recognizing (or understanding) a Short SSID, or whether the AP is capable only of recognizing (or understanding) full SSIDs. In response to determining that the AP does not support probe requests addressed to a Short SSID, the STA may, at 406, generate the probe request addressed to a BSSID of the AP. In such scenarios, the STA may further address the probe request to the Short SSID, or may omit the SSID (e.g., set the SSID field to a wildcard value).

The probe request generated at 406 may include an instruction (or indication, request, etc.) for the AP to transmit, in its probe response, the full SSID corresponding to the Short SSID. For example, the instruction may indicate that the AP should use the full SSID when identifying the service set in the probe response. For example, the probe request may include a dedicated (e.g., one-bit) field, wherein one or more first values indicate that the probe response should include the full SSID, and one or more second values indicate that the probe response should include the Short SSID, or, alternatively, that the probe response need not include the full SSID (e.g., that the STA has no preference regarding whether the probe response includes the full SSID).

In response to determining at 404 that a full SSID associated with the Short SSID is known to the STA (e.g., if the STA has a record, such as in a preferred network list, associating a full SSID with the Short SSID), then the STA may, at 408, generate the probe request addressed to the full SSID associated with the Short SSID (e.g., omitting the Short SSID from the probe request). For example, the SSID field (or similar field) in the body of probe request may include the full SSID. In other scenarios, the STA may, at 408, choose based on additional criteria whether to generate the probe request addressed to the full SSID or to generate the probe request addressed to the Short SSID, despite having knowledge of the full SSID, e.g., to reduce message overhead. As one example of such a criterion, in some scenarios, the STA may determine whether the AP is capable of responding to a probe request addressed to a Short SSID (e.g., as discussed with regard to 406), and if the AP does not support responding to probe requests addressed to a Short SSID, then the STA may, at 408, generate the probe request addressed to the full SSID.

Alternatively, or additionally, the STA may, at 408, generate the probe request addressed to a BSSID of the AP, e.g., in a manner similar to that described with regard to 406.

In some scenarios, the probe request generated at 408 may include an instruction (or indication, request, etc.) for the AP to use the Short SSID when identifying the service set in the probe response. This may decrease overhead required in transmitting the probe response. In some scenarios, the STA may use additional criteria in determining whether to instruct the AP, in the probe request generated at 408, to use the Short SSID or the full SSID in the probe response. In some scenarios, the STA may indicate in the probe request generated at 408 that it has no preference regarding whether the AP uses the Short SSID or the full SSID when identifying the service set in the probe response.

The probe request generated at either of 406 or 408 may include an indication of whether the probe request is addressed to the Short SSID or to the full SSID. For example, the probe request may include a dedicated (e.g., one-bit) field, wherein one or more first values indicate that the probe request is addressed to the Short SSID, and one or more second values indicate that the probe request is addressed to the full SSID. As another example, the probe request may repurpose a legacy field. For example, the probe request may include a Length field, for which a value of "0" is presently undefined when used in the 6 GHz band. Thus, when generating the probe request for transmission in the 6 GHz band, the STA may set the value of the Length field to "0" if an associated SSID field of the probe request contains the Short SSID, and, if the associated SSID field instead contains the full SSID, then the STA may set the value of the Length field to indicate the length of the SSID (or of the SSID field). Other signaling also may be used to differentiate between the use of a full SSID and a Short SSID.

In some implementations, to reduce overhead related to the transmission of scanning messages, the generated probe request may contain two or more SSIDs, including any combination of Short SSIDs and/or full SSIDs.

The probe request may further include additional information, such as communication rates and/or other capabilities supported by the STA, as well as requests for additional information from the AP, which may be useful in determining whether the STA can/should join the service set associated with the SSID to which the probe request is addressed.

At 410, the STA may transmit the probe request generated at either of 406 or 408. In some scenarios, the probe request may be transmitted on the second frequency band, e.g., if the first message includes an indication that the service set supports communications on the second frequency band.

The AP (or other STA) that transmitted the first message may receive the probe request and determine to transmit a probe response that is responsive to the probe request, e.g., based on the probe request being addressed to the SSID (e.g., either the Short SSID or the full SSID) of the service set supported by the AP. The probe response transmitted by the AP may identify the service set by the full SSID and/or the Short SSID, e.g., responsive to the instruction included in the probe request. The probe response may include various items/elements of information regarding capabilities and/or configurations of the service set associated with the SSID. In some scenarios, the AP may transmit one or more beacons instead of, or in addition to, a probe response. In such scenarios, the one or more beacons may include items/elements of information similar to those described in connection with the probe response, such as the full SSID and/or the Short SSID.

At 412, the STA may receive the probe response (or beacon). The STA may read, extract, save, and/or otherwise use any applicable information included in the probe response (or beacon), e.g., for use in determining whether to join the service set identified therein. In some scenarios, the probe response (or beacon) may include the full SSID corresponding to the Short SSID received in the first message.

At 414, the STA may store a record associating the full SSID with the Short SSID, e.g., in a list of known/preferred networks. In some scenarios, the record may be stored only when the association was not previously known/stored. For example, the record may be stored if the STA determines (e.g., in response to determining) at 404 that a full SSID associated with the Short SSID is not known to the STA.

Figure 5:
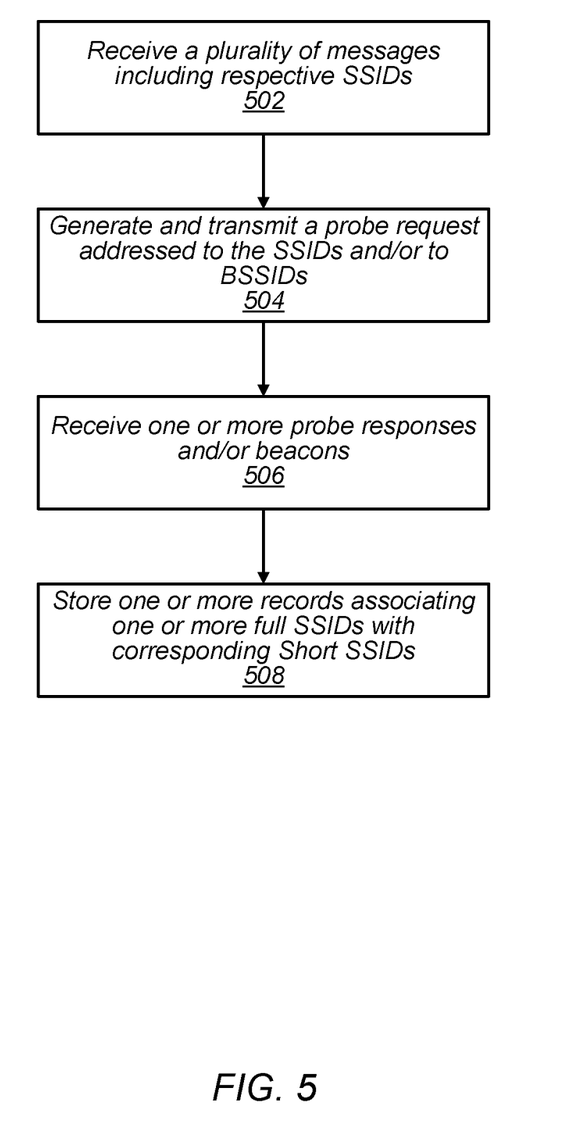
FIG. 5 is a flow chart illustrating an exemplary method for performing network probing in a scenario that may include multiple SSIDs, according to some embodiments.
Figure 6:
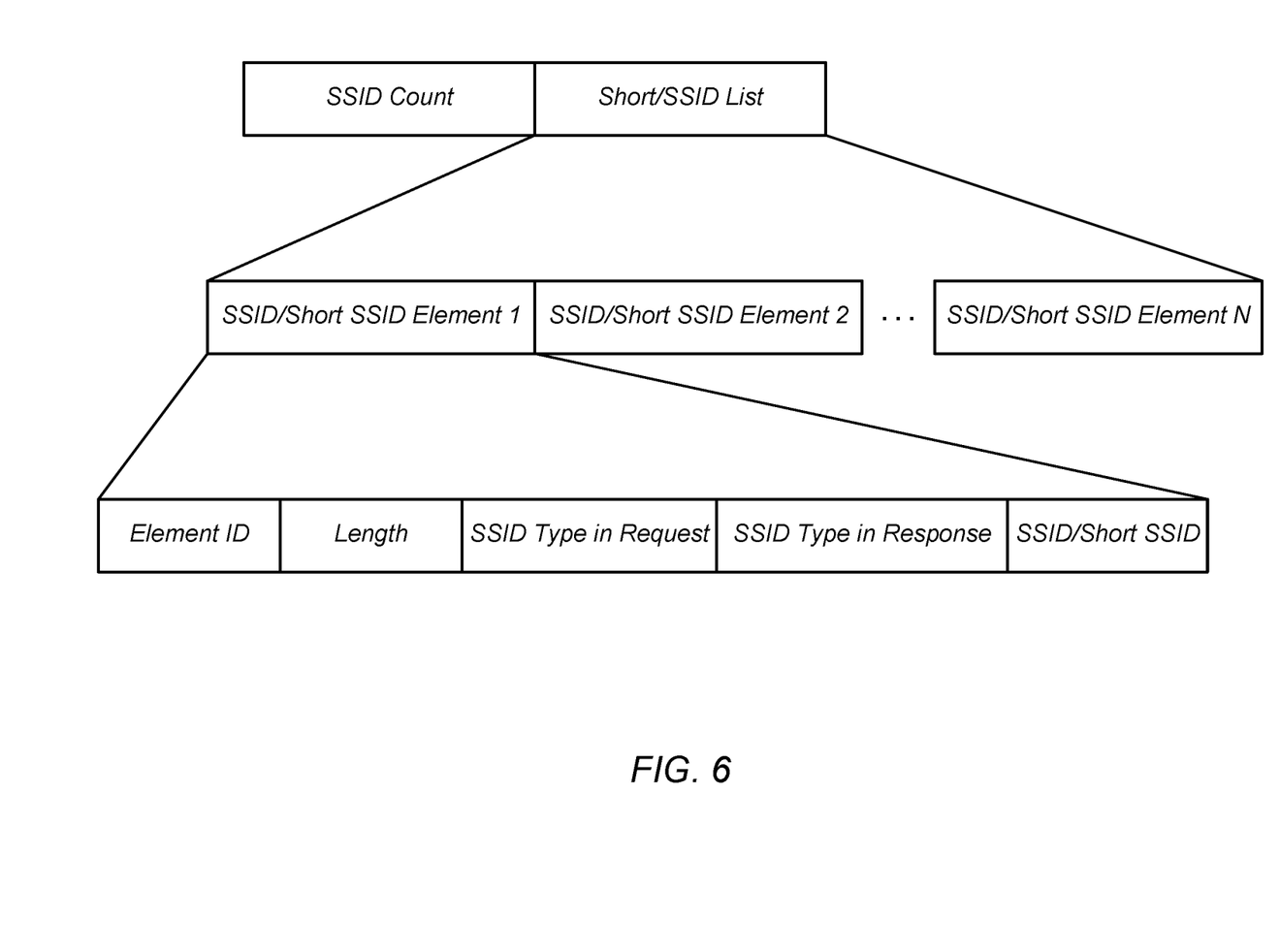
FIG. 6 illustrates an example portion of a probe request frame, including fields relevant to addressing the probe request to one or more SSIDs, according to some embodiments.
Figure 7:
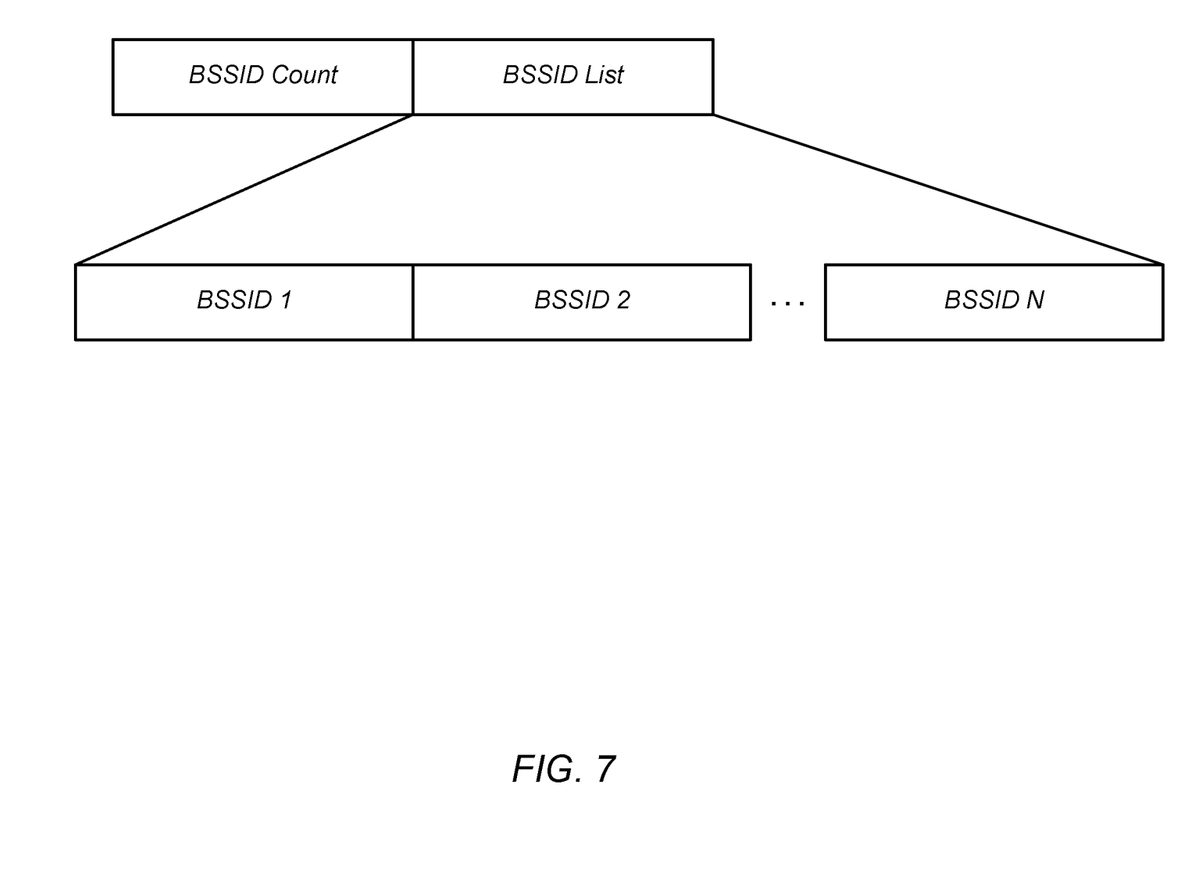
FIG. 7 illustrates an example portion of a probe request frame, including fields relevant to addressing the probe request to one or more BSSIDs, according to some embodiments.

In some scenarios, the probe request may include additional information and functionality, e.g., as illustrated in any/all of FIGS. 5-7.

FIG. 5 is a flow chart illustrating a method for performing network probing in a scenario that may include multiple SSIDs, according to some embodiments. In various embodiments, the method illustrated in FIG. 5 may be performed by a STA, such as the UE 106; or by one or more components thereof, such as the wireless communication circuitry 230 or the WLAN Logic 232. In various embodiments, the method of FIG. 5 may be performed in conjunction with any/all of that of FIG. 4. As shown, the method may operate as follows.

At 502, the STA may receive a plurality of messages. Each message of the plurality of messages may be received from a respective AP (or other STA), and may identify a respective service set supported by the respective AP. In some scenarios, one or more message of the plurality of messages may identify the respective service set by an SSID. In some scenarios, one or more of the SSIDs may be a Short SSID. In some scenarios, one or more of the SSIDs may be a full SSID. In some scenarios, one or more messages of the plurality of messages may identify a respective AP by a BSSID. In some scenarios, one or more messages of the plurality of messages may be equivalent to the first message described in connection with 402 of FIG. 4. If a message of the plurality of messages includes a full SSID of which the STA does not have a previous record, then the STA may, in some scenarios, store a record of the new SSID, e.g., in a known/preferred network list. In some scenarios, the STA may also perform a CRC function, or appropriate compression function, to generate a Short SSID corresponding to the new full SSID. The Short SSID may also be stored in association with the full SSID.

At 504, the STA may generate and transmit a probe request addressed to the SSIDs and/or BSSIDs received in the plurality of messages. For example, the body of the probe request may include an SSID List field or similar field, such that any AP receiving the probe request should (e.g., is invited or instructed to) reply with a probe response if the AP supports the service set identified by any of the SSIDs included in the SSID List field. Thus, the probe request may be addressed to a plurality of SSIDs. For example, for each of the SSIDs received in the plurality of messages (or some subset thereof), the STA may address the probe request to either a Short SSID or a corresponding full SSID (e.g., mutually exclusively). For example, if a particular received message includes a full SSID, then the STA may address the probe request to the full SSID, or may elect to address the probe request to a corresponding Short SSID, e.g., to save overhead. Alternatively, if a particular received message includes a Short SSID (e.g., does not include a full SSID), then the STA may determine to address the probe request to either the Short SSID or to the full SSID, e.g., based on the criteria discussed with regard to 404-408 of FIG. 4. Such a determination may be made with regard to each SSID received (or some subset thereof), such that the probe request is addressed to a plurality of SSIDs, identifying a corresponding plurality of service sets. As another example, the body of the probe request, or a header of the probe request, may include a BSSID List field or similar field, such that any AP receiving the probe request should reply with a probe response if the AP is associated with (e.g., identified by) a BSSID in the BSSID field. Addressing the probe request to a plurality of SSIDs and/or a plurality of BSSIDs may significantly reduce overhead, relative to addressing a separate probe request to each SSID/BSSID.

One or more APs (or other STAs) may receive the probe request and determine that the probe request is addressed to the AP or a service set supported thereby. One or more such APs may reply to the probe request by transmitting a responsive probe response and/or one or more beacon(s). For example, the probe response (or beacon) may identify a supported service set by either a Short SSID or a full SSID, as instructed by the probe request. Further, the probe response may include various items/elements of information regarding capabilities and/or configurations of the service set associated with the SSID. In some scenarios, the probe response may be equivalent to the probe request described in connection with 412 of FIG. 4.

At 506, the STA may receive one or more such probe responses and/or beacon(s). The STA may read, extract, save or otherwise use any applicable information included in any of the probe responses (or beacons), e.g., for use in determining whether to join a service set identified therein.

At 508, the STA may store, e.g., in a list of known/preferred networks, one or more records associating one or more full SSID(s) included in respective probe response(s) and/or beacon(s) with one or more Short SSID(s) received in one or more message(s) of the plurality of messages of 502. In some scenarios, the record(s) may be stored only if the respective association was not previously known/stored. In some scenarios, a single probe request may result in identifying multiple new networks.

In general, it should be appreciated that FIG. 4 and FIG. 5 may, in some scenarios, be used in conjunction. For example, the first message received at 402 may be one of the plurality of messages received at 502. Similarly, generating a probe request addressed to the Short SSID at 406 and/or generating a probe request addressed to the full SSID at 408 may be included in generating a probe request addressed to the plurality of SSIDs at 504. For example, in some scenarios, the probe request of FIG. 4 may be addressed to one or more additional SSID(s), in addition to the Short SSID received at 402 or its corresponding full SSID, e.g., as described at 504. Such additional SSID(s) would identify different service sets than the service set identified by the Short SSID received in the first message at 402. Similarly, the probe request and/or beacon received at 412 may be one of the one or more probe requests and/or beacons received at 506, and the record stored at 414 may be included in the one or more records recorded at 508.

In other scenarios, the method illustrated in FIG. 5 may be used independent of the method of FIG. 4. For example, according to FIG. 5, the STA may receive a plurality of messages including respective SSIDs (at 502), and may generate and transmit a probe request addressed to the SSIDs, wherein all of the SSIDs included in the received plurality of messages are full SSIDs (e.g., wherein none of the messages include a Short SSID). As another example, according to FIG. 5, the STA may receive a plurality of messages including respective SSIDs and BSSIDs (at 502), and may generate and transmit a probe request addressed to the BSSIDs, wherein the probe request may not include any SSIDs.

FIG. 6 illustrates an example portion of a probe request frame (e.g., a portion of the body of a probe request frame), according to some embodiments. Specifically, FIG. 6 illustrates fields relevant to addressing the probe request to one or more SSIDs, which fields may be included in the probe requests discussed in connection with FIG. 4 and/or FIG. 5. It should be understood that these fields are merely examples, and may, in some embodiments, be omitted or replaced with fields having other structure.

As shown in FIG. 6, the probe request may include an SSID Count field and a Short/SSID List field. The SSID Count field may include an indication of the number of SSIDs included in the Short/SSID List field; e.g., a number of SSIDs to which the probe request is addressed. The Short/SSID List field may include one or more SSIDs, which may include full SSIDs and/or Short SSIDs. Specifically, the probe request may be considered to be "addressed to" the SSIDs included in the Short/SSID List field. The probe request may alternatively be considered to be "addressed to" any AP(s) that support(s) a service set identified by one of the included SSIDs.

As shown, the Short/SSID List field may include one or more (e.g., N) SSID/Short SSID Element fields. An SSID/Short SSID Element field may include an SSID, as well as various supporting information. For example, the SSID/Short SSID Element field may include an SSID/Short SSID field which may include the actual SSID; e.g., either a Short SSID or a full SSID. SSID/Short SSID Element field may further include a field indicating whether a probe response sent in reply to the probe request should include a full SSID or a Short SSID. Such a field is illustrated as an SSID Type in Response field. As one example, this may be a one-bit field, with a first value (e.g., 0) indicating that a Short SSID should be included in the probe response, and a second value (e.g., 1) indicating that a full SSID should be included. In some embodiments, this field may be omitted.

The SSID/Short SSID Element field may include a field indicating whether the SSID/Short SSID field of the present SSID/Short SSID Element field includes a Short SSID or a full SSID. Such a field is illustrated as an SSID Type in Request field. As one example, this may be a one-bit field, with a first value (e.g., 0) indicating that a Short SSID is included in the SSID/Short SSID field, and a second value (e.g., 1) indicating that a full SSID is included. In some embodiments, this field may be omitted.

The SSID/Short SSID Element field may include a Length field. As previously discussed, the Length field may indicate the length of the SSID/Short SSID field, or of the SSID included therein. In some embodiments, a value of 0 in the Length field may indicate that the SSID/Short SSID field includes a Short SSID, while other values may indicate that the SSID/Short SSID field includes a full SSID of length specified by the value. In such embodiments, the SSID Type in Request field may be omitted. In some embodiments, the Length field may be omitted.

The SSID/Short SSID Element field may include an Element ID field, which may uniquely identify the SSID/Short SSID Element field among the others within the Short/SSID List. In some embodiments, this field may be omitted.

In some embodiments, the probe request may include only a single SSID. In some such embodiments, the probe request may indicate in the SSID Count field that the Short/SSID List field includes only one SSID, and the Short/SSID List field may include only a single SSID/Short SSID Element field. Alternatively, the probe request may omit the SSID Count field and the Short/SSID List field, and may instead include a reduced field, such as a single SSID/Short SSID Element field, e.g., of the type illustrated in FIG. 6. Other configurations are also envisioned.

FIG. 7 illustrates an example portion of a probe request frame (e.g., a portion of the body of the frame or the MAC header of the frame), according to some embodiments. Specifically, FIG. 7 illustrates fields relevant to addressing the probe request to one or more BSSIDs, which fields may be included in the probe requests discussed in connection with FIG. 4, FIG. 5, and/or FIG. 6. It should be understood that these fields are merely examples, and may, in some embodiments, be omitted or replaced with fields having other structure.

As shown in FIG. 7, the probe request may include a BSSID Count field and a BSSID List field. The BSSID Count field may include an indication of the number of BSSIDs included in the BSSID List field; e.g., a number of BSSIDs to which the probe request is addressed. The BSSID List field may include one or more BSSID(s). Specifically, the probe request may be considered to be "addressed to" the BSSID(s) included in the BSSID List field. Thus, an AP may transmit a probe response that is responsive to a probe request if the AP determines that the probe request is addressed to the AP by virtue of the probe request including a BSSID associated with the AP (e.g., without regard to whether the probe request includes an SSID supported by the AP). In some scenarios, such a probe response may always identify the service set supported by the AP by its full SSID. In other scenarios, such a probe response may identify the service set by its full SSID unless the body of the probe request specifies otherwise. A BSSID associated with a particular AP may be included in a probe request, e.g., based on a previous message received from that AP, regardless of whether the previous message identified a service set using a full SSID or a Short SSID.

In some scenarios, the BSSID List field may be omitted, or may be set to a value indicating that no particular BSSID is specified, such as a "broadcast" value. In some such scenarios, the probe request may be addressed based on other fields, such as an SSID field or a Short/SSID List field.

It should be understood that the preceding methods and illustrations are merely examples, and additional variations are possible. In various embodiments, some of the elements of the methods shown may be omitted. For example, with regard to FIG. 4, the method may, in some scenarios, be complete following 410, e.g., if no AP responds to the probe request. Alternatively, the method may be complete following 412, e.g., if the received probe response does not identify any new association between a full SSID and a Short SSID. Similarly, the method of FIG. 5 may similarly be complete following 504 or 506. Additional method elements may also be performed as desired.

Additionally, or alternatively, some of the elements of the methods shown may be performed concurrently, or in a different order than shown. For example, in some embodiments, a probe request may be generated to include a plurality of SSIDs, that were received in a plurality of messages received over a span of time. In such embodiments, the STA may determine whether a full SSID is known to correspond with a Short SSID in a first message of the plurality of messages (e.g., as described at 404/504), prior to, or concurrent with, receiving a second message of the plurality of messages (e.g., as described at 402/502). Similarly, in some embodiments, a plurality of probe responses may be received (e.g., as described at 506), and the STA may evaluate and store records (e.g., as described at 508) resulting from a first probe response prior to, or concurrent with, receiving a second probe response.

Example Embodiments

Specific examples of particular implementations may include the following, among others.

A method of performing network probing, may include: by a user equipment device (UE): receiving a plurality of messages from a plurality of access points (APs), each message of the plurality of messages including a respective service set identifier (SSID) of a service set supported by the respective AP; and transmitting a probe request addressed to the SSIDs of each of the respective APs of the plurality of APs, wherein at least one of the SSIDs is a Short SSID comprising a compressed version of a full SSID.

In some scenarios, each message of the plurality of messages is received in a first frequency band, and includes an indication that the respective AP supports a service set in a second frequency band.

In some scenarios, for each SSID to which the probe request is addressed, the probe request further comprises a field indicating whether the SSID is a full SSID or a Short SSID.

In some scenarios, the field indicating whether the SSID is a full SSID or a Short SSID comprises a Length field, wherein a value of 0 in the Length field indicates that the SSID is a Short SSID, and wherein a value other than 0 in the Length field indicates that the SSID is a full SSID having a length specified by the value of the Length field.

In some scenarios, for each SSID to which the probe request is addressed, the probe request further includes a field indicating whether a probe response to be transmitted by the AP associated with the SSID in response to the probe request should identify the service set using a full SSID or a Short SSID.

In some scenarios, the probe request further comprises a field indicating a count of the SSIDs to which the probe request is addressed.

In some scenarios, the probe request is further addressed to a plurality of basic service set identifiers (BSSIDs), wherein the probe request comprises a field indicating a count of the BSSIDs to which the probe request is addressed.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or any combination of the method embodiments described herein, or any subset of any of the method embodiments described herein, or any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or any combination of the method embodiments described herein, or any subset of any of the method embodiments described herein, or any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE) comprising:
a radio;
a memory;
processor circuitry communicatively coupled to the radio and the memory, wherein the processor circuitry is configured to:
receive from an access point (AP), via the radio, a first message comprising a Short service set identifier (SSID), the Short SSID comprising a compressed version of a full SSID of a service set supported by the AP;
determine whether a record associating a full SSID with the Short SSID is stored in the memory; and
transmitting, via the radio, a probe request, wherein, in response to determining that no record associating the full SSID with the Short SSID is stored in the memory, the probe request is addressed to the Short SSID.

2. The UE of claim 1, wherein, in response to determining that a record associating the full SSID with the Short SSID is stored in the memory, the probe request is addressed to the full SSID.

3. The UE of claim 1, wherein the probe request comprises a field indicating whether the probe request is addressed to the Short SSID or the full SSID.

4. The UE of claim 3, wherein the field indicating whether the probe request is addressed to the Short SSID or the full SSID comprises a Length field, wherein a value of 0 in the Length field indicates that the probe request is addressed to the Short SSID, and wherein a value other than 0 in the Length field indicates that the probe request is addressed to the full SSID, the full SSID having a length specified by the value of the Length field.

5. The UE of claim 1, wherein the processor circuitry is further configured to:
in response to determining that no record associating the full SSID with the Short SSID is not stored in the memory, include in the probe request an instruction for the AP to transmit a probe response comprising the full SSID.

6. The UE of claim 1, wherein the processor circuitry is further configured to:
in response to determining that a record associating the full SSID with the Short SSID is stored in the memory, include in the probe request an instruction for the AP to use the Short SSID to identify the service set in the probe response.

7. The UE of claim 1, wherein the probe request comprises a field indicating whether a probe response that is responsive to the probe request is to include the Short SSID or the full SSID to identify the service set.

8. The UE of claim 1, wherein the processor circuitry is further configured to:
receive from the AP, via the radio, a probe response comprising the full SSID; and
store in the memory a record associating the full SSID with the Short SSID.

9. The UE of claim 1, wherein the probe request is addressed to a plurality of SSIDs of a plurality of service sets, the plurality of SSIDs comprising the received Short SSID.

10. The UE of claim 9, wherein the plurality of SSIDs comprises at least one full SSID of a service set other than the service set associated with the received Short SSID.

11. The UE of claim 9, wherein the probe request further comprises a field indicating a count of the SSIDs to which the probe request is addressed.

12. The UE of claim 1, wherein the probe request is further addressed to a plurality of basic service set identifiers (BSSIDs), wherein the probe request comprises a field indicating a count of the BSSIDs to which the probe request is addressed.

13. The UE of claim 1, wherein the first message is received in a first frequency band and comprises a report that the AP supports communications on a second frequency band.

14. A non-transitory computer-readable memory medium storing software instructions configured to, when executed by a processor of a user equipment device (UE), cause the UE to:
receive, from an access point (AP), a first message comprising a Short service set identifier (SSID), the Short SSID comprising a compressed version of a full SSID of a service set supported by the AP;
determine whether the UE has a record associating a full SSID with the Short SSID; and
transmit a probe request, wherein, in response to determining that the UE has no record associating the full SSID with the Short SSID, the probe request is addressed to the Short SSID.

15. The non-transitory computer-readable memory medium of claim 14, wherein, in response to determining that a record associating the full SSID with the Short SSID is stored in the memory, the probe request is addressed to the full SSID.

16. The non-transitory computer-readable memory medium of claim 14, wherein the software instructions are further configured to cause the UE to:
in response to determining that the UE has no record associating the full SSID with the Short SSID, include in the probe request an instruction for the AP to transmit a probe response comprising the full SSID.

17. The non-transitory computer-readable memory medium of claim 14, wherein the software instructions are further configured to cause the UE to:
in response to determining that the UE has no record associating the full SSID with the Short SSID, include in the probe request an instruction for the AP to transmit a probe response comprising the full SSID.

18. A method of performing network probing, the method comprising:
by a user equipment device (UE):
receiving, from an access point (AP), a first message comprising a Short service set identifier (SSID), the Short SSID comprising a compressed version of a full SSID of a service set supported by the AP;
determining whether the UE has a record associating a full SSID with the Short SSID; and
transmitting a probe request, wherein, in response to determining that the UE has no record associating the full SSID with the Short SSID, the probe request is addressed to the Short SSID.

19. The method of claim 18, further comprising:
receiving, from the AP, a probe response comprising the full SSID; and
storing a record associating the full SSID with the Short SSID.

20. The method of claim 18, wherein the probe request is addressed to a plurality of SSIDs of a plurality of service sets, the plurality of SSIDs comprising the received Short SSID and at least one full SSID of a service set other than the service set associated with the received Short SSID.

\* \* \* \* \*